(12) United States Patent
Thonnelier

(10) Patent No.: US 8,210,505 B2
(45) Date of Patent: Jul. 3, 2012

(54) CORRUGATED CRISS-CROSSING PACKING STRUCTURE

(75) Inventor: Jean-Yves Thonnelier, Voisins le Bretonneux (FR)

(73) Assignee: L'Air Liquide Societe Anonyme pour l'Etude et l'Exploitation des Procedes Georges Claude, Paris (FR)

( * ) Notice: Subject to any disclaimer, the term of this patent is extended or adjusted under 35 U.S.C. 154(b) by 1112 days.

(21) Appl. No.: 10/592,996

(22) PCT Filed: Mar. 10, 2005

(86) PCT No.: PCT/FR2005/050154
§ 371 (c)(1),
(2), (4) Date: Mar. 23, 2007

(87) PCT Pub. No.: WO2005/092491
PCT Pub. Date: Oct. 6, 2005

(65) Prior Publication Data
US 2008/0036102 A1    Feb. 14, 2008

(30) Foreign Application Priority Data
Mar. 16, 2004  (FR) ..................................... 04 50520

(51) Int. Cl.
*B01F 3/04* (2006.01)
(52) U.S. Cl. .............................. 261/112.2; 261/DIG. 72
(58) Field of Classification Search ............... 261/112.1, 261/112.2, DIG. 72
See application file for complete search history.

(56) References Cited

U.S. PATENT DOCUMENTS

| | | | |
|---|---|---|---|
| 3,158,527 A | 11/1964 | Koeller et al. | |
| 3,830,684 A | 8/1974 | Hamon | |
| 4,731,229 A | 3/1988 | Sperandio | |
| 5,073,236 A * | 12/1991 | Gelbein et al. | 203/29 |
| 5,470,542 A | 11/1995 | Stringaro | |
| 6,334,985 B1 | 1/2002 | Raghuram et al. | |
| 6,565,629 B1 * | 5/2003 | Hayashida et al. | 95/211 |
| 2002/0063344 A1 * | 5/2002 | Pagade | 261/94 |
| 2003/0124038 A1 | 7/2003 | Moritz et al. | |
| 2004/0173344 A1 | 9/2004 | Averous et al. | |

FOREIGN PATENT DOCUMENTS

| | | |
|---|---|---|
| EP | 0 201 614 | 11/1986 |
| EP | 0 631 813 | 1/1995 |
| EP | 0 885 653 | 12/1998 |
| GB | 1 341 981 | 12/1973 |
| JP | 10-281677 | 10/1998 |
| WO | WO 97 16247 | 5/1997 |
| WO | WO 99 34911 | 7/1999 |
| WO | WO 02 095315 | 11/2002 |

OTHER PUBLICATIONS

International Search Report for PCT/FR2005/050154, Jul. 2005.
Written Opinion of PCT/FR2005/050154, Nov. 2006.

* cited by examiner

*Primary Examiner* — Scott Bushey
(74) *Attorney, Agent, or Firm* — Elwood L. Haynes

(57) ABSTRACT

The invention relates to a corrugated criss-crossing packing structure for installations that transfer material and/or heat between a gas phase and a liquid phase, comprising a first surface (10), called the primary surface, having a number of parallel channels (11). According to the invention, this structure has a second surface (20), called the secondary surface, comprised of a number of secondary packing elements (21, 31), each secondary packing element being placed inside a channel (11) of said primary surface (10) and being formed separately from the first surface. The invention is for use in cryogenic distillation.

6 Claims, 3 Drawing Sheets

CORRUGATED CRISS-CROSSING PACKING STRUCTURE

The present invention relates to a cross-corrugated packing structure. In particular, it relates to a cross-corrugated packing structure for installations for transferring material and/or heat between a gas phase and a liquid phase, and more particularly distillation such as cryogenic distillation.

The invention has a particularly advantageous application in the field of cryogenic distillation, particularly for separating air gases or for separating mixtures containing hydrogen and carbon monoxide.

In this type of application, the cross-corrugated packing structure is the reference as regards organized packings. It consists of a set of modules or "packs", each formed from a stack of surfaces, or strips, obliquely corrugated alternately in one direction and in the other.

The corrugations of each surface, also called fins, consist of parallel channels made from smooth or textured sheets, generally metal, perforated or not. For example, a surface for cross-corrugated packing can be fabricated economically from a standard grade aluminum strip by simple mechanical operations, such as bending and perforation.

In the case of distillation columns, the corrugated surfaces are contained in vertical planes general. The modules are usually turned through 90° about the axis of the column from one pack to the next.

The cross-corrugated structure is imposed today as the only one permitting the construction of columns of all sizes without reducing the intrinsic efficiency observed at small scale.

By varying the height of the fins, the density of the structure, expressed in $m^2/m^3$, can be adjusted. In doing so, a contrariwise change is observed in two properties, whose optimization is also desirable, that is, capacity and efficiency. In fact, a dense structure with a high $m^2/m^3$ value provides a high efficiency packing but one which, by easily flooding, offers low capacity. Conversely, a loose structure permits high throughputs, but with lower efficiency.

By adjusting the density, various types of packing structures can be defined to adapt ideally to the various cases considered, for example:

high efficiency structures are reserved for small columns, where diameter is not the main parameter, conversely, for very large units, and to obtain a maximum throughput in a diameter imposed by construction and/or transport restrictions, priority is assigned to capacity, even if the height may have to be increased.

To reduce the flooding effect that limits the capacity of the cross-corrugated packing structures conventionally used, WO 97/16247 proposes, as surface corrugations, S shaped channels whose generatrices are curved at each end to become vertical at the upper and lower edges of the module. This particular shape, which makes the channels vertically upright at the interfaces between packs, has served to optimize the "efficiency-capacity" curve in the sense that, for the same structure in terms of general channel shape and density, the flooding limits have been extended by about 30%, without substantially affecting efficiency.

However, even if it has marked a considerable advance in the field of cross-corrugated packings, the latter structure of S shaped channels nevertheless maintains its intrinsic limits, that is, by increasing the channel density, to achieve higher efficiency, the spatial mesh is densified, and capacity is reduced, and, conversely, by enlarging the spatial mesh, capacity is increased but correlatively, the interfacial area and hence the efficiency of the gas-liquid exchanges is decreased.

Thus, the technical problem to be solved by the object of the present invention is to propose a cross-corrugated packing structure for cryogenic distillation installations, comprising a first surface, called primary surface, having a plurality of parallel channels, decisively extending the limits inherent in currently known structures, including that described in WO 97/16247.

According to the present invention, the solution to the technical problem consists in forming the secondary elements separately from the first surface.

The secondary elements may be detachable.

The design of this type of structure with two surfaces, and not a single surface as in the structures of the prior art, results from the applicant's merit in having realized that the limits of the known cross-corrugated packings are due to the fact that the single surface, known as the main surface in the context of the present invention, simultaneously performs two functions, on the one hand, at a "macroscopic" scale, the spatial organization into an infinity of intersecting channels for exchanges between opposing channels, and, on the other, at a "microscopic" scale, mass exchanges between the gas phase and the liquid phase.

On the contrary, the invention dissociates these two functions, which are accordingly separated into a primary wide mesh cross-corrugated structure, necessary and sufficient for throughput and uniformity of the flows, particularly in large columns, and a secondary structure, added on to the interior of the primary structure, specifically improving the gas-liquid exchanges, without attempting a spatial organization.

More precisely, since the density of a cross-corrugated packing varies with 1/h where h is the height of the channels, the invention, for a target density that would be obtained with a height h for a conventional single surface structure, serves to obtain the same final density but with a surface distribution between the primary, cross-corrugated surface, and the secondary surface housed in the channels of the primary surface.

One can thereby conceive of a primary surface with a corrugated structure of height 2h, hence supplying half of the total target surface, and a secondary surface supplying the other half, or more generally, as provided for by the invention, a distribution between (1−x) of primary surface and x of secondary surface (0<x<1).

The description that follows, with reference to the drawings appended hereto, given as nonlimiting examples, will clarify the invention and show how it can be implemented.

FIG. 3b is a perspective view of a variant of the packing element in FIG. 3a.

FIG. 7b is a perspective view of the secondary packing element in FIG. 7a.

FIG. 1 shows a perspective view of a portion of cross-corrugated packing structure designed for cryogenic distillation installations, particularly for separating gas mixtures.

Figure 1:
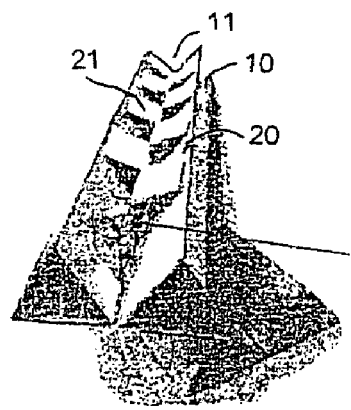
FIG. 1 is a perspective view of a first embodiment of a cross-corrugated packing structure of the invention.
Figure 2:
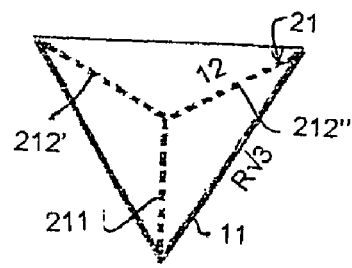
FIG. 2 is a side view of the structure in FIG. 1.

This structure comprises a first surface 10, or primary surface, having corrugations consisting, in the example in FIG. 1, of parallel channels 11 with an equilateral triangle cross section as shown in FIG. 2.

The structure in FIG. 1 also comprises a second surface 20, or secondary surface, consisting of a plurality of secondary packing elements 21, each secondary element 21 being arranged inside a channel 11 of the primary surface 10.

Figure 3A:
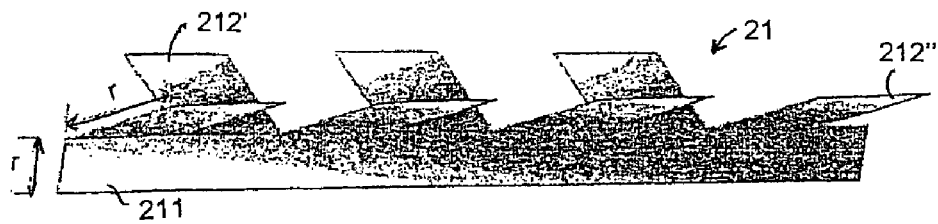
FIG. 3a is a perspective view of a secondary packing element of the structure in FIG. 1.
Figure 3B:
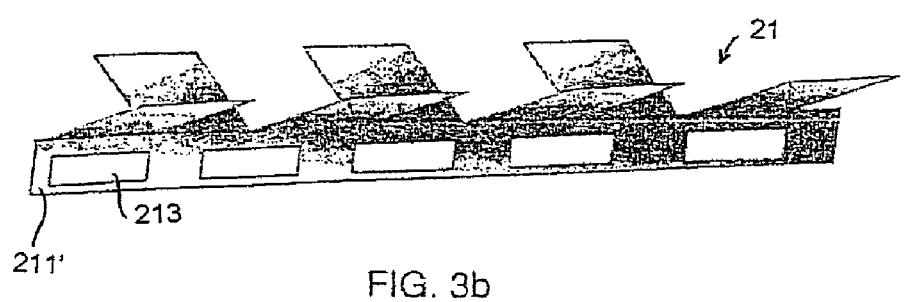

As shown in FIG. 3a and in the variant in FIG. 3b, the secondary packing element 21 has a periodic structure along channel 11 of the primary surface 10.

In general, the secondary elements 21 in FIGS. 3a and 3b can be made from flat metal strips by cutting, perforation and/or bending distinct from the first surface. More precisely, in the embodiments in FIGS. 3a and 3b, the secondary elements 21 are obtained from a strip of height 2r sectioned at regular intervals along half of its height, leaving a heel 211, 211'. The sectioned parts are alternately bent rightward and leftward equilaterally to form the fins 212', 212". In the case of FIG. 3b, the heel 211' has equidistant perforations 213.

The secondary elements 21 thereby obtained are housed inside the channel 11 in the arrangement shown in FIG. 2.

In this embodiment, the elementary mesh of the structure consists of the two sides of the equilateral triangle forming the channel 11. Since each side of the channel participates in two channels, the cross section per channel 11 of primary surface is proportional to $r\sqrt{3}$, where r is the radius of the circle circumscribed in the equilateral triangle in FIG. 2. Furthermore, the cross section of the secondary element 21 is proportional to 2r. The cross sectional distribution between primary surface 10 and secondary surface 20 is thus made in a ratio of (1−x) to x with x close to 0.5, here x=0.464.

In the variant in FIG. 3b, the ratio (1−x)/x is lower, but remains about 1.

Figure 5:
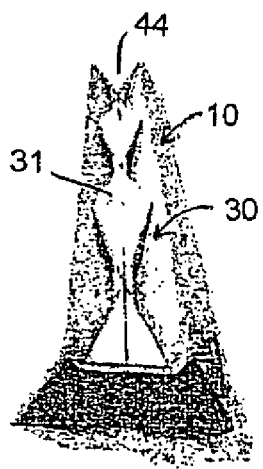
FIG. 5 is a perspective view of a second embodiment of a cross-corrugated packing structure of the invention.
Figure 6:
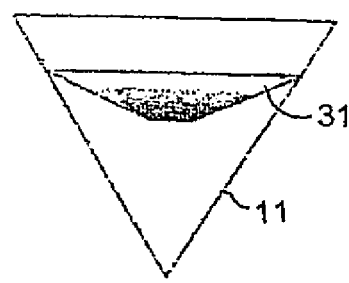
FIG. 6 is a side view of the structure in FIG. 5.

According to the embodiment in FIG. 5, the basic corrugated primary surface 10 is identical to that in FIG. 1 with an equilateral triangle elementary channel 11.

Figure 7A:
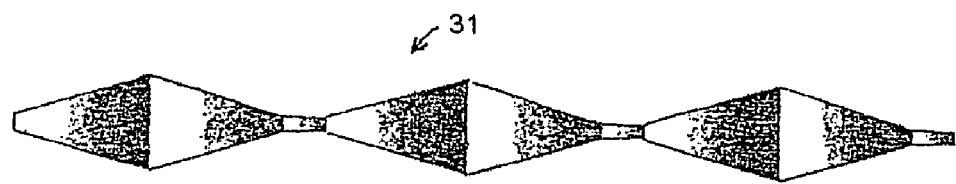
FIG. 7a is a plan view of a secondary packing element of the structure in FIG. 5.
Figure 7B:
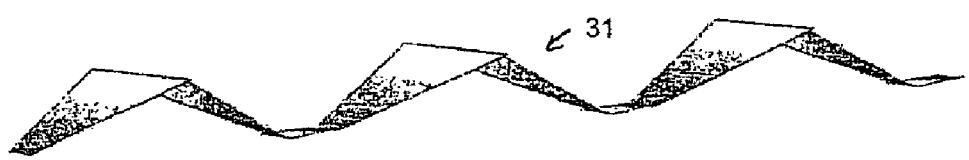

By contrast, the elementary element 31 of the secondary surface 30 of the packing structure is cut out from a strip along the plane in FIG. 7a, then bent to form the corrugations as shown in FIG. 7b, which are then housed in the channel 11.

The cross section of the secondary surface 20 is lower here than in the preceding case. A greater restriction is also introduced in the cross section offered to the gas (in the first example, the secondary surfaces are strictly parallel to the gas flow), and an exchange element is similarly introduced between channels, the gas deflected by the inclined surface forming an obstacle being redirected toward the opposite channel.

Figure 4:
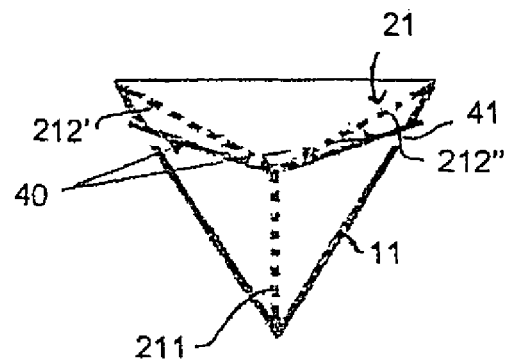
FIG. 4 is a cross section of a variant of the structure in FIG. 1 including the fastening tabs.
Figure 8:
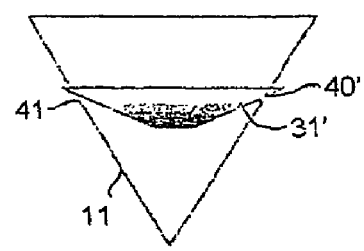
FIG. 8 is a side view of a variant of the structure in FIG. 5 including the fastening tabs.

As shown in FIGS. 4 and 8, the secondary elements 21 and 31' can be snap fastened in the channel 11 by means of tabs 40, 40' arranged on the secondary elements 21, 31' and inserted into openings 41 made through the walls of the channel 11.

Obviously, many variants exist for the basic shapes described above with reference to the drawings appended hereto, either by varying the bending pitch and the angles, or by adding additional folds to the secondary structure forming deflectors.

Another family of solutions consists in placing twisted strips forming secondary elements with an endless screw structure.

Irrespective of their shape, the secondary surfaces are hence individual elements to be housed in each channel.

The S shape of the new packings as described in international application No. WO 97/1624, provides an effective closure of the channels at their ends: once the packing module is constructed, the secondary surface elements are imprisoned in the channels, even if not physically attached thereto.

Once the secondary elements are placed in the channels of a packing strip, one strip out of two is turned over and mounted intersecting the first. The strip to be turned over may be temporarily covered by a plane face, the combination turned over on the other corrugated strip and the plane face then slid out by pulling.

The invention claimed is:

1. A cross-corrugated packing structure for installations for transferring material and/or heat between a gas phase and a liquid phase, comprising a first surface, called primary surface, having a plurality of parallel channels, said structure comprising a second surface, called secondary surface, consisting of a plurality of secondary packing elements, each secondary packing element being arranged inside a channel of said primary surface, wherein the secondary elements are formed separately from the first surface, wherein said secondary packing elements have a periodic structure along the channels of the primary surface, said secondary packing elements are made from flat metal strips, said flat metal strips are cut and/or perforated and/or bent alternately leftward and rightward into a Y shape.

2. The packing structure of claim 1, wherein said secondary packing elements have a periodic structure along the channels of the primary surface.

3. The packing structure of claim 1, wherein the heel of the Y shape has periodic perforations.

4. The packing structure of claim 1, wherein said secondary packing elements have tabs for snap-in fastening in the channels of the primary surface.

5. The packing structure of claim 1, wherein the channels of the primary surface have an S shape.

6. The packing structure of claim 1, characterized by a distribution of cross section (1−x)/x between primary surface and secondary surface with x less than 1 and greater than 0.5.

* * * * *